Dec. 6, 1932.  R. A. KAPLAN  1,889,750
METHOD OF AND APPARATUS FOR REMOVING HUBS
Filed Dec. 26, 1929  3 Sheets-Sheet 1
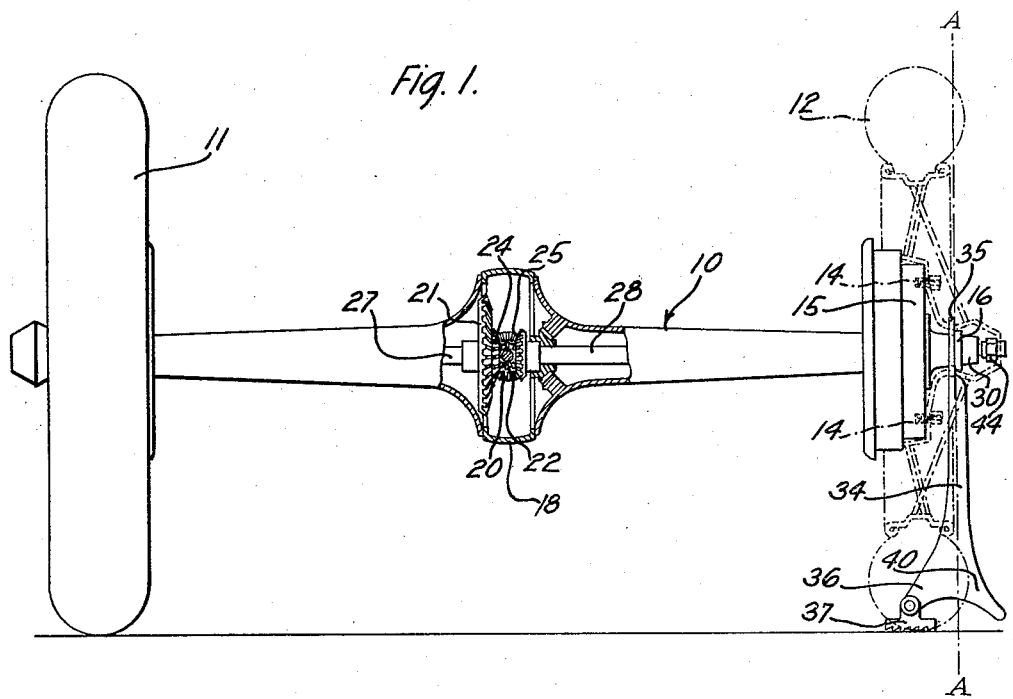
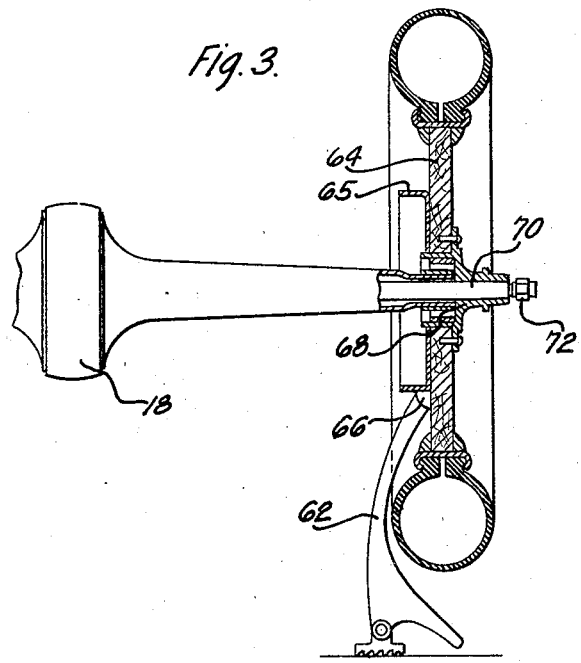
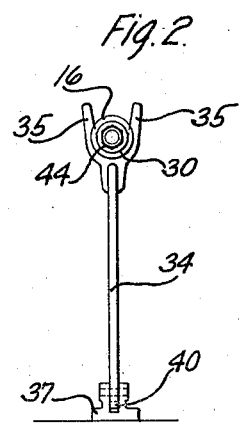
Inventor
Reuben A. Kaplan
By Archie P. McCrady Att'y.

Dec. 6, 1932.  R. A. KAPLAN  1,889,750
METHOD OF AND APPARATUS FOR REMOVING HUBS
Filed Dec. 26, 1929  3 Sheets-Sheet 2
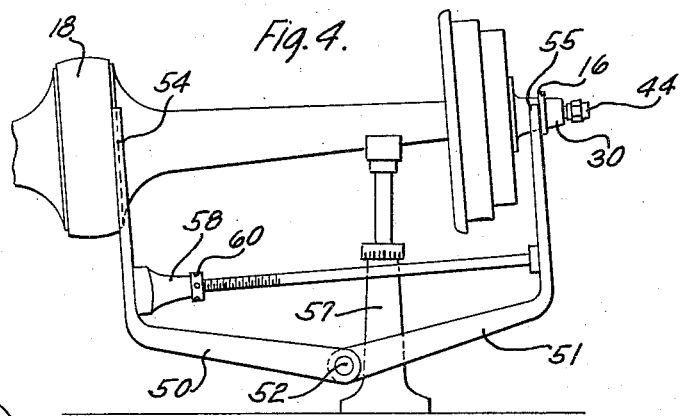
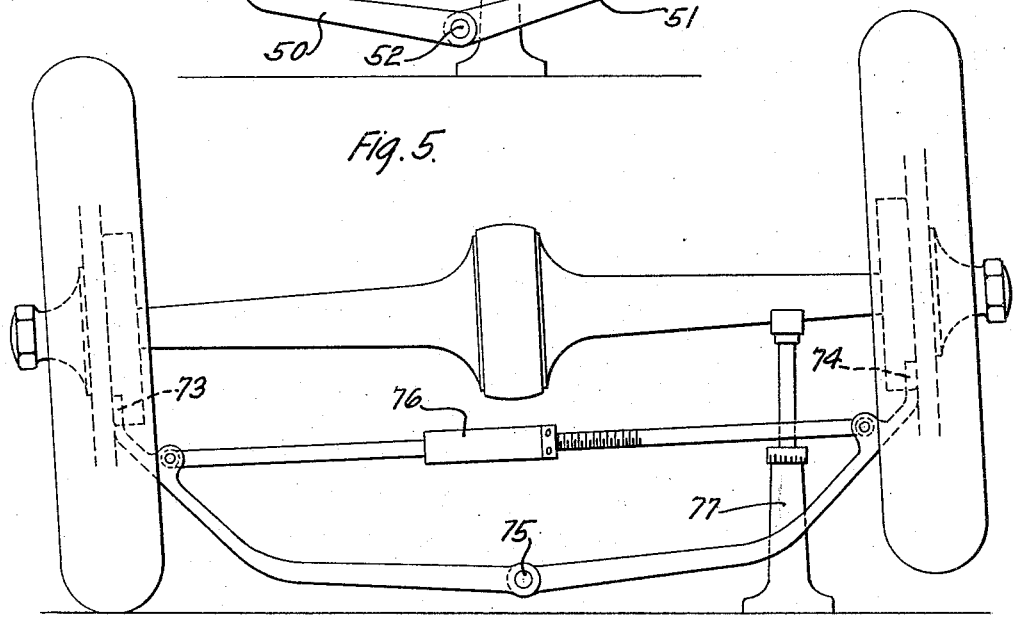
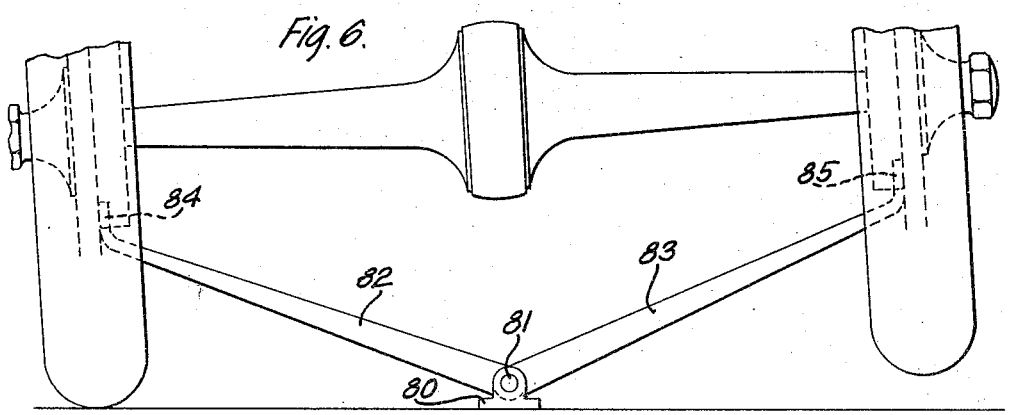
Inventor
Reuben A. Kaplan Dec. 6, 1932.   R. A. KAPLAN   1,889,750
METHOD OF AND APPARATUS FOR REMOVING HUBS
Filed Dec. 26, 1929   3 Sheets-Sheet 3
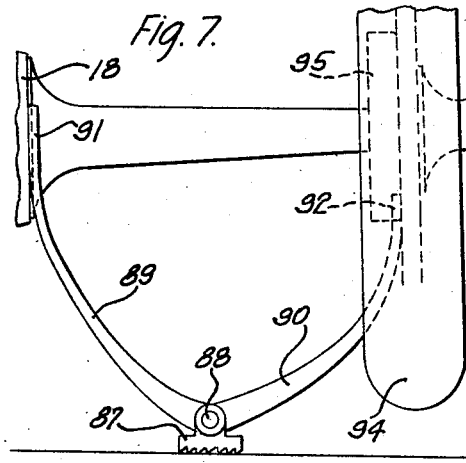
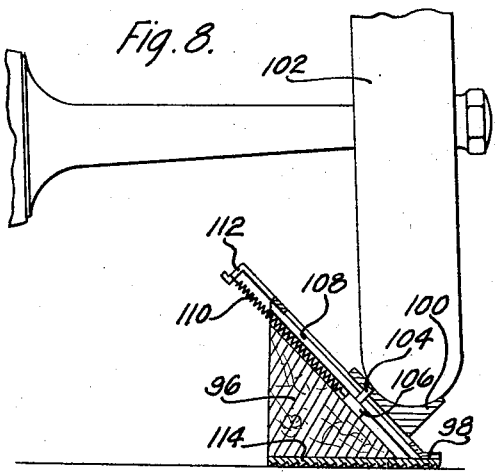
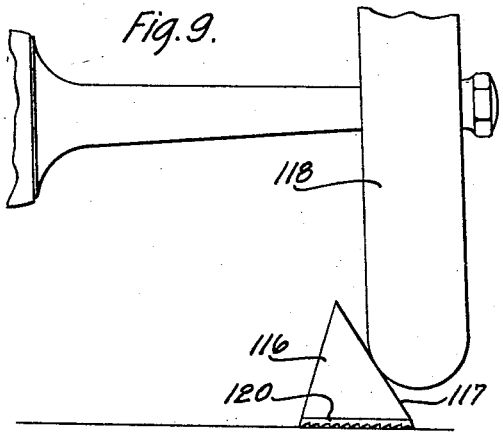
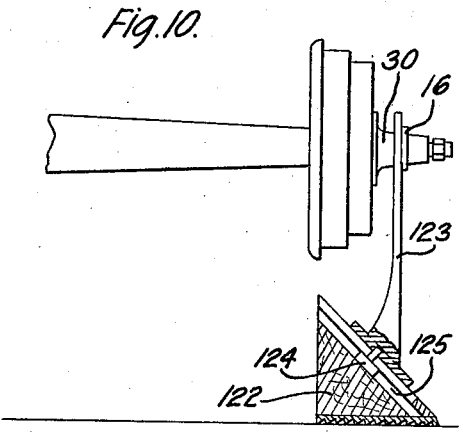
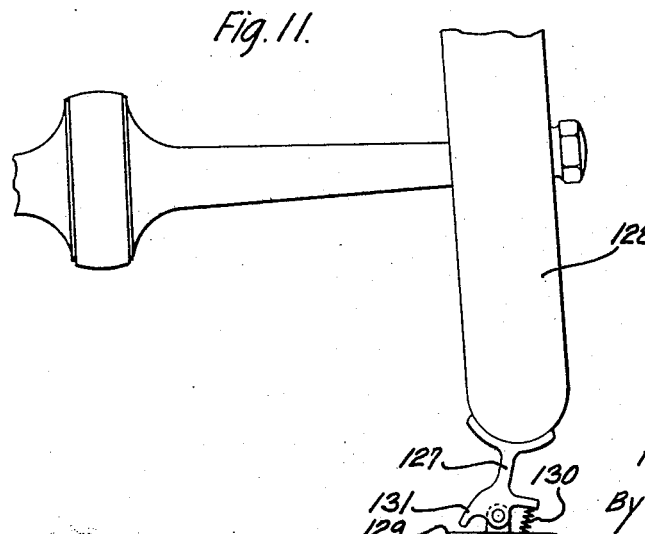
Inventor
Reuben A. Kaplan
By Archie R. McCrady Att'y.

Patented Dec. 6, 1932

1,889,750

UNITED STATES PATENT OFFICE

REUBEN A. KAPLAN, OF OWATONNA, MINNESOTA, ASSIGNOR TO OWATONNA TOOL COMPANY, OF OWATONNA, MINNESOTA, A CORPORATION OF MINNESOTA

METHOD OF AND APPARATUS FOR REMOVING HUBS

Application filed December 26, 1929. Serial No. 416,351.

This invention relates to a method of and apparatus for removing the wheels or hubs from the axle shafts of automobiles and other automotive vehicles.

The invention is especially applicable to the removal of the rear or driving wheels of automobiles, although it may also be applied to the removal of other members from the shafts upon which they are mounted.

An object of the invention is to provide an improved method of and apparatus for removing automobile wheels, hubs, and the like, from the members upon which they are mounted.

Further objects of the invention will be apparent from the following description, taken in connection with the appended drawings, in which Fig. 1 is a rear elevation, partly in section, of the rear wheel-and-axle assembly of an automobile, showing a tool which embodies the invention applied thereto;

Fig. 2 is an end view of the tool; and

Figs. 3, 4, 5, 6, 7, 8, 9, 10 and 11 are fragmentary views similar to Fig. 1, but showing modified forms of the invention.

Referring more particularly to Figs. 1 and 2, the rear axle assembly of an automobile of a well-known type is designated generally by the reference numeral 10, and the rear wheels by reference numerals 11 and 12, the wheel 12 being represented in section and by dotted lines. The rear wheels shown in this modification are detachable from their hubs by removing bolts 14, which secure them to the brake drums 15, and the hubs are provided with annular flanges or other projections 16 to facilitate their removal from the axle shafts. Within the differential housing 18, a driving pinion 20 and gear 21 are shown in the usual relation, also a differential pinion 22 and axle gears 24 and 25, which are secured to the rear axle shafts 27 and 28, respectively. The hub 30, which it is desired to remove, has a tapered bore which fits on the tapered end of axle shaft 28 in the usual manner.

The tool which forms an embodiment of this invention comprises a rigid member 34 having at its upper end means for quickly engaging and supporting the hub, such as the diverging prongs 35 which are adapted to receive the hub 30 therebetween, the prongs being preferably so designed as to enable them to accommodate hubs of different sizes. At its lower end, member 34 is provided with an inwardly and downwardly extending portion 36 to the end of which is pivoted a gripping member 37 adapted to rest upon the floor or ground and having serrations on its lower surface to prevent slipping. In use, the member 37 is positioned inwardly of a vertical line A—A which passes through the point where the prongs 35 engage the hub. A projection 40 extends outwardly from the lower end of member 34 to act as a stop in case member 37 or tire 11 slips under the weight of the car, and is of such length as to engage the floor outwardly of the line A—A and thus continue to support the car if such slippage occurs.

In the operation of this embodiment, the wheel 12 is first raised clear of the floor by a jack or other means applied to the axle housing, and the wheel is then removed by removing the hub cap (not shown) and bolts 14. The tool above described is then placed in position as shown in Fig. 1, so that the member 37 is positioned inwardly with respect to line A—A, and the jack is lowered, allowing the weight of the car to rest on the tool, with the result that prongs 35 move outwardly along the hub 30 and bear outwardly against flange 16, thereby exerting an outward pressure against the hub 30 and shaft 28 considered as a unit, the two being hereinafter referred to as the hub-and-shaft assembly. This outward pressure is resisted by the wheel 11, which rests upon the ground or floor, and results in moving the shaft 28 outwardly by a distance equal to whatever end play may exist between the beveled axle gear 25 and the gears with which it meshes. The end of axle 28 is likewise separated from the differential spider (not shown) or from any other part against which it may be designed to bear, and a similar action takes place in the bearings of wheel 12.

A driving nut 44 is then screwed onto the end of shaft 28, replacing the usual axle nut, and the driving nut is struck with a hammer or other means to cause the shaft 28 to move inwardly while the hub and its associated parts tend to remain stationary due to inertia. It will be seen that the shaft may move inwardly by the amount of its end play without any other part of the mechanism moving, and the gear 25 and the other parts associated with the axle 28 will not be injured by the impact of the blows delivered at 44, since they cannot be forcibly stuck together while the hub remains in place on the shaft unless the force of the blow is sufficient to rotate the tool about member 37, thereby raising the center of gravity of the car by a corresponding amount. It will be readily seen that only a very slight movement between the hub and axle is necessary, since a slight movement will loosen the hub so as to make its complete removal easy.

The embodiment shown in Fig. 3 is designed for use with automobiles of the type wherein the rear wheels are not readily detachable from their hubs, with the result that it is more convenient to remove the wheels and hubs together. The tool 62 shown in this figure is similar in principle to that shown in Figs. 1 and 2, but its upper end is shaped to engage the wheel 64 and brake drum 65 as indicated at 66 in such a manner as to exert an outward thrust on the hub 68 to tend to move it off from the axle shaft 70. This takes up the end play in the gearing and prevents damage thereto in the same manner as explained above in connection with Figs. 1 and 2. A driving nut 72 similar to nut 44 is also employed with this modification.

In the embodiment shown in Fig. 4, a similar result is obtained by means of a pair of arms 50, 51, pivoted together at 52 and having forked ends 54, 55 adapted to engage respectively the differential housing 18 and the flange 16 of the hub 30. In this embodiment, the rear axle of the car is supported by a jack 57 or other means and the arms are forced apart by means of a jack-screw 58 adapted to fit therebetween in such manner as to force them apart when rotated by means of a nut 60.

The modification shown in Fig. 5 is similar to that shown in Fig. 4 except that its forked ends 73, 74 are designed to engage the wheels adjacent the brake drums to thereby exert an outward force against both wheels simultaneously. The arms are pivoted together at 75 and urged apart by means of a jackscrew 76, the wheel to be removed being elevated by means of a jack 77.

Fig. 6 shows a modification of the embodiment shown in Fig. 5, differing therefrom in that a shoe 80 is secured to the pivot 81 connecting the arms 82 and 83, which shoe rests on the floor or ground, so that the weight of the car causes the forked ends 84 and 85 to press outwardly against the wheels adjacent the brake drums.

The tool shown in Fig. 7 also has a shoe 87 secured to the pivot 88 connecting the arms 89 and 90, but the forked ends 91 and 92 are designed to engage respectively the differential housing 18 and the wheel 94 adjacent the brake drum 95 to urge the wheel outwardly under the influence of the weight of the car.

The embodiment shown in Fig. 8 comprises a block 96 having one of its faces inclined at about 45 degrees to form an inclined plane and provided with a smooth metallic plate 98 which forms a sliding surface for a cradle 100 which is shaped to receive the tire 102 of the wheel which is to be removed. The cradle is slidably mounted on the plate 98 by means of a bolt 104 fixed thereto and having its head 106 slidable in a T-slot 108 formed in the block 96 and plate 98. A tension spring 110 secured to the head 106 and to a projection 112 of plate 98 tends to hold the cradle in its uppermost position, and a base plate 114 provided with a roughened surface is secured to the under surface of the block to prevent the block slipping on the floor. In the use of this embodiment the wheel is elevated by a jack or other lifting means (not shown) until the cradle 100 may be inserted under the tire, whereupon the weight of the car is released by removing the lifting means, and the cradle moves downwardly under the weight of the car, simultaneously moving the wheel outwardly to take up the end play in the gearing in the same manner as in the embodiments above described.

A simplified construction along the line of that described in connection with Fig. 8 is shown in Fig. 9, wherein a block 116 is provided with a smooth inclined face 117 adapted to receive the tire 118 in sliding relation, and the block is prevented from sliding by means of a serrated base plate 120.

The modification shown in Fig. 10 comprises a block 122 which supports an upright member 123 forked at its upper end to receive the hub 30 and press outwardly against the flange 16 thereon. The member 123 is provided with a headed bolt 124 which slides in a T-slot 125 formed in the block 122 and functions in a manner similar to the embodiment shown in Fig. 8 to urge the hub outwardly.

In the embodiment shown in Fig. 11, a cradle 127, shaped to receive the tread of tire 128, is pivotally supported on a serrated base member 129. A coiled spring 130 is positioned between the base member and a projection on the cradle to hold the latter in proper position for use, and a projection 131 formed on the inner portion of the cradle is designed to contact with the base member to prevent the cradle from overturning inwardly in case the base member 129 or the other tire (not shown) slips on the ground or floor.

The term "wheel assembly" as used herein includes the hub, spokes, rim, tire, brake drum, and/or any other elements which may form a part of the rotatable unit mounted on the axle shaft. Where mention is made of removing a hub it is intended to include the removal of such hub with or without the remainder of the wheel assembly.

While the invention has been described with reference to certain specific embodiments thereof, it will be understood that it may be embodied in other forms without departing from the spirit of the invention. Thus, the tools shown in Figs. 5 and 6 may with slight changes be adapted to engage the hub after the wheel has been removed, in the manner of the tool shown in Fig. 4, and various means may be used for forcing apart the pivoted arms of the embodiments shown in Figs. 4, 5 and 7. It should also be noted that in any of the illustrated embodiments, while the wheel or hub to which the tool is directly applied is considered as the one to be removed, the opposite wheel or hub may also be removed, since the play in the other wheel or hub is also effectually taken up. The invention is therefore not intended to be limited except by the terms of the appended claims.

What is claimed is:

1. The method of removing a hub from an axle shaft of an automotive vehicle, which consists in causing the weight of the vehicle to exert an outward force against the hub to take up play in the gears and bearings associated with the shaft, and simultaneously exerting a sudden inward force upon the shaft to displace it relative to the hub.

2. A tool for removing a hub from an automotive vehicle axle shaft, comprising a rigid member having a portion adapted to rest on and grip the floor or ground inwardly of the hub to support the axle, and another portion adapted to engage the hub, the member being free to tilt about the portion resting on the floor to thereby exert an outward force against the hub.

3. A tool for removing a hub from an automotive vehicle axle shaft, comprising a rigid member having a bifurcated upper end adapted to support the hub at more than its normal distance from the floor or ground, the lower end of the rigid member being adapted to engage the floor or ground, said rigid member having a portion extending outwardly therefrom to engage the floor or ground should the lower end slip relative to the floor or ground.

4. A tool for removing a hub from an axle of an automotive vehicle, comprising a rigid member capable of supporting the weight normally supported by one wheel of the vehicle, and having one of its ends adapted to engage the floor or ground and its other end adapted to engage a portion of the wheel assembly outwardly of the first mentioned end in such relation as to exert an outward force against the hub.

5. A tool for removing a hub from an automotive vehicle axle shaft, comprising a member having a portion adapted to engage a part of the wheel assembly, a second member connected to the first mentioned member and having a portion adapted to engage a portion of the vehicle inwardly of the hub, and means for urging the first and second mentioned portions away from each other.

6. A tool for removing a hub from an automotive vehicle axle shaft, comprising a pair of members having their adjacent ends pivoted together and having their free ends adapted to engage respectively a part of the wheel assembly and another portion of the vehicle, and means for urging said free ends away from each other.

7. A tool for removing a wheel from an automotive vehicle axle shaft, comprising a member having a portion adapted to engage the wheel and exert an outward force thereagainst, another member connected to the first mentioned member and having a portion adapted to engage a part of the vehicle positioned inwardly of the hub, and means for urging the first and second mentioned portions away from each other.

8. A tool for removing a hub from the axle shaft of an automotive vehicle, comprising a rigid member adapted to engage a portion of the wheel assembly and exert an outward force against the hub and having a portion adapted to engage the ground or floor inwardly of the wheel assembly, and a second rigid member connected to the first mentioned member and adapted to engage a portion of the vehicle positioned inwardly of the wheel assembly.

9. A tool for removing a wheel from an automotive vehicle axle shaft, comprising a member having a portion adapted to engage a part of the wheel assembly and exert an outward force thereagainst and another portion adapted to rest on the floor or ground inwardly of the first mentioned portion, and another member connected to said other member and having a portion adapted to engage another portion of the vehicle.

10. A tool for removing a wheel or hub from an axle of an automotive vehicle, comprising a member having an inclined surface, and a second member slidably mounted on said surface and adapted to support the wheel or hub to be removed.

11. A tool for removing a hub from an automotive vehicle axle shaft, comprising a member having a portion adapted to engage the hub and exert an outward force thereagainst, and another member supporting the first mentioned member and operative by the weight of the car to urge the first mentioned member outwardly.

12. A tool for removing a wheel from an automotive vehicle axle shaft, comprising a base member adapted to rest on the floor or ground, and a member connected to the base member by a pivotal connection and adapted to engage the tire of the wheel outwardly of said pivotal connection.

13. A tool for removing a wheel or hub from an axle of an automotive vehicle, comprising a base member having an inclined surface, a second member slidably mounted on said surface and adapted to support the wheel or hub to be removed, and yielding means for restoring the second member to its uppermost position.

14. A tool for removing a hub from an automotive vehicle axle shaft, comprising a rigid member adapted to engage a portion of the wheel assembly and exert an outward force against the wheel assembly and having a portion adapted to engage the ground or floor inwardly of said wheel assembly, and a second rigid member connected to the first mentioned member and adapted to engage the opposite wheel assembly.

15. The method of removing a hub from an axle shaft of an automotive vehicle, which comprises supporting the hub in such a way as to cause a portion of the weight of the vehicle to exert an outward force against the hub and shaft, and simultaneously subjecting the shaft so supported to an inwardly directed impact to displace it relative to the hub.

In witness whereof I hereunto subscribe my name this 19th day of December, 1929.

REUBEN A. KAPLAN.